US012547818B2

(12) United States Patent
Lai et al.

(10) Patent No.: US 12,547,818 B2
(45) Date of Patent: Feb. 10, 2026

(54) SUBEVENT RELATION EXTRACTION

(71) Applicant: ADOBE INC., San Jose, CA (US)

(72) Inventors: Viet Dac Lai, Eugene, OR (US); Franck Dernoncourt, Seattle, WA (US)

(73) Assignee: ADOBE INC., San Jose, CA (US)

( * ) Notice: Subject to any disclaimer, the term of this patent is extended or adjusted under 35 U.S.C. 154(b) by 222 days.

(21) Appl. No.: 18/478,221

(22) Filed: Sep. 29, 2023

(65) Prior Publication Data

US 2025/0111129 A1    Apr. 3, 2025

(51) Int. Cl.
*G06F 40/14*    (2020.01)
*G06F 40/279*    (2020.01)

(52) U.S. Cl.
CPC ............ *G06F 40/14* (2020.01); *G06F 40/279* (2020.01)

(58) Field of Classification Search
CPC ...... G06F 40/14; G06F 40/279; G06F 40/211; G06F 40/289; G06F 40/30
See application file for complete search history.

(56) References Cited

U.S. PATENT DOCUMENTS 12,147,388 B1 * 11/2024 Sharma .................. G06F 16/13
2020/0050672 A1 * 2/2020 Jade ....................... G06F 40/30

OTHER PUBLICATIONS

Lai, et al., "Multilingual SubEvent Relation Extraction: A Novel Dataset and Structure Induction Method", In Findings of the Association for Computational Linguistics: EMNLP 2022, December, pp. 5559-5570.

Man, et al., "Selecting optimal context sentences for event-event relation extraction", In Proceedings of the Association for the Advancement of Artificial Intelligence (AAAI), 2022, pp. 11058-11066.

Man, et al., "Event causality identification via generation of important context words", In Proceedings of the 11th Joint Conference on Lexical and Computational Semantics, pp. 323-330, 2022, Seattle, Washington. Association for Computational Linguistics.

Guzman-Nateras, et al., "Cross-lingual event detection via optimized adversarial training", In Proceedings of the 2022 Conference of the North American Chapter of the Association for Computational Linguistics: Human Language Technologies, pp. 5588-5599, Seattle, United States. Association for Computational Linguistics.

* cited by examiner

*Primary Examiner* — Asher D Kells
(74) *Attorney, Agent, or Firm* — F. CHAU & ASSOCIATES, LLC

(57) ABSTRACT

A method, apparatus, and non-transitory computer readable medium for natural language processing are described. Embodiments of the present disclosure include obtaining a document comprising a first event mention and a second event mention. Some embodiments generate a dependency tree based on the document. The dependency tree is pruned by removing an irrelevant word to obtain a pruned dependency tree. Subevent relation information is generated for the first event mention and the second event mention based on the pruned dependency tree.

19 Claims, 12 Drawing Sheets

SUBEVENT RELATION EXTRACTION

BACKGROUND

The following relates generally to natural language processing (NLP), and more specifically to relation extraction using machine learning. Natural language processing refers to techniques of using computers to interpret natural language. In some cases, NLP tasks involve assigning annotation data, such as grammatical information, to words or phrases within a natural language expression. Different classes of machine learning algorithms have been applied to NLP tasks. Subevent relation extraction is a sub-field of NLP that involves identifying and extracting event relationships between multiple events mentioned in a document.

In some cases, an event is understood as a thing that occurs or changes the state of an entity. A general event (or a super-event) may involve multiple subevents that provide details about the general event. Accordingly, subevent relation extraction tasks involve identifying and predicting whether a first event mention is a subevent of a second event mention, and vice versa. Subevent relation extraction can be applied in event understanding, information retrieval, summarization, etc.

SUMMARY

The present disclosure describes systems and methods for natural language processing. Embodiments of the present disclosure include an NLP apparatus trained to predict a subevent relation between two event events (e.g., whether a first event mention is a subevent of a second event mention) in a document. The subevent relation between two events includes parent-child, child-parent, or null (i.e., no relation). In some examples, the NLP apparatus receives a document including two event mentions via a user interface. In some embodiments, an NLP model generates a dependency tree based on the document and identifies non-dependency path (non-DP) important words (e.g., context words). A subevent relation extraction (SRE) machine learning model identifies a dependency path (DP) between two event mentions and performs optimal transport between in-DP words and non-DP words to identify irrelevant words in a dependency tree. The machine learning model prunes the dependency tree by eliminating the irrelevant words to obtain a pruned dependency tree, which is then used for subevent relation prediction. In some examples, a non-DP word is considered important and retained in the pruned dependency tree if the non-DP word is aligned with at least one of the in-DP words.

A method, apparatus, and non-transitory computer readable medium for natural language processing are described. One or more embodiments of the method, apparatus, and non-transitory computer readable medium include obtaining a document comprising a first event mention and a second event mention; generating a dependency tree based on the document; pruning the dependency tree by removing an irrelevant word to obtain a pruned dependency tree; and generating subevent relation information for the first event mention and the second event mention based on the pruned dependency tree.

A method, apparatus, and non-transitory computer readable medium for natural language processing are described. One or more embodiments of the method, apparatus, and non-transitory computer readable medium include obtaining training data including ground-truth relation information for a first event mention and a second event mention in a document; initializing a subevent relation extraction machine learning model (hereinafter "SRE machine learning model"); generating a dependency tree based on the document; pruning the dependency tree by removing an irrelevant word to obtain a pruned dependency tree; generating predicted subevent relation information using the initialized SRE machine learning model based on the pruned dependency tree; and training the SRE machine learning model based on the predicted subevent relation information and the ground-truth relation information.

An apparatus and method for natural language processing are described. One or more embodiments of the apparatus and method include at least one processor; at least one memory including instructions executable by the at least one processor; a natural language processing (NLP) model configured to generate a dependency tree based on a document comprising a first event mention and a second event mention; a pruning component configured to prune the dependency tree by removing an irrelevant word to obtain a pruned dependency tree; and an SRE machine learning model comprising parameters stored in the at least one memory and trained to generate subevent relation information for the first event mention and the second event mention based on the pruned dependency tree.

DETAILED DESCRIPTION

Figure 1:
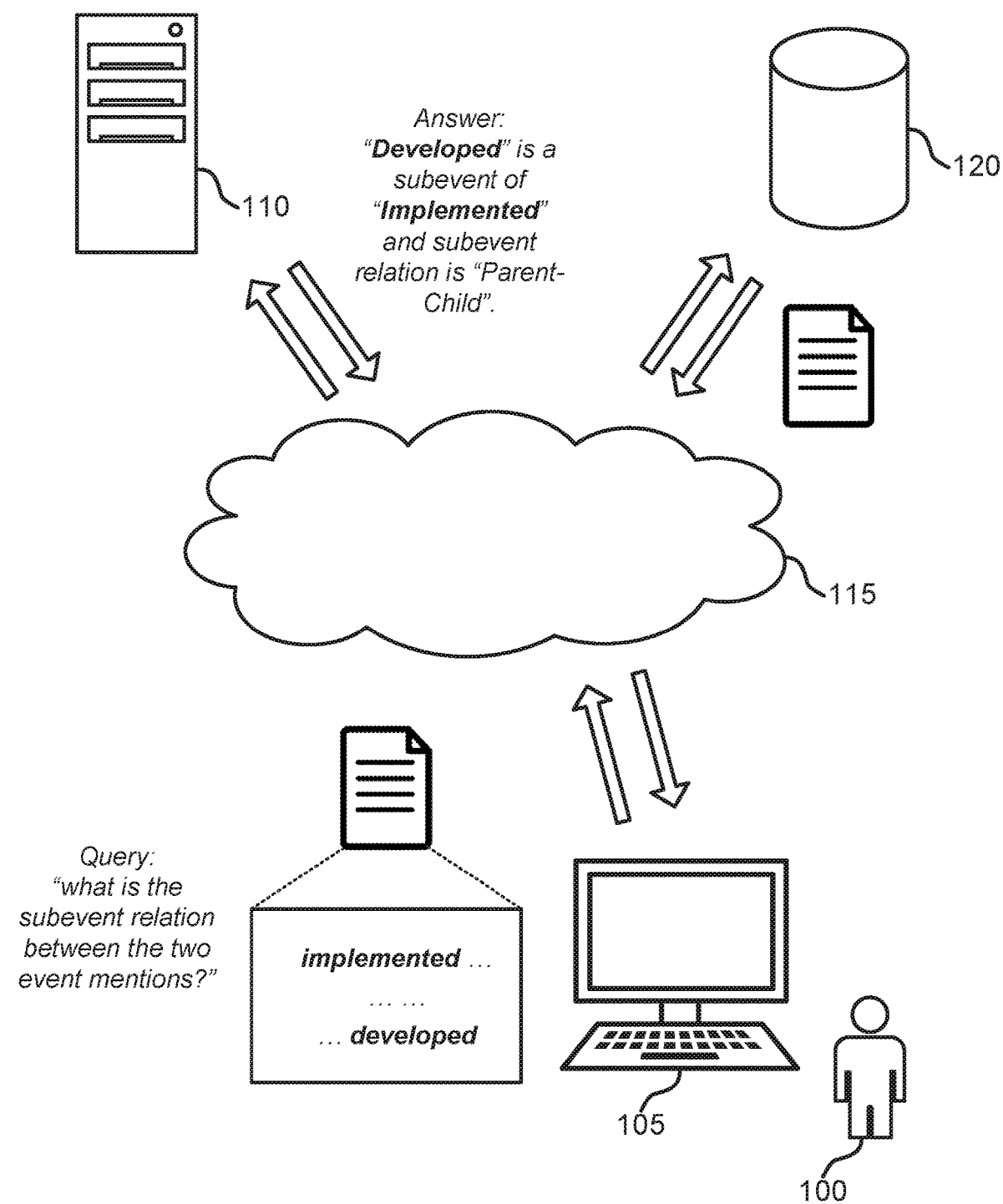
FIG. 1 shows an example of a natural language processing system according to aspects of the present disclosure.

The present disclosure describes systems and methods for natural language processing. Embodiments of the present disclosure include an NLP apparatus trained to predict a subevent relation between two event events (e.g., whether a first event mention is a subevent of a second event mention) in a document. The subevent relation between two events includes parent-child, child-parent, or null (i.e., no relation). In some examples, the NLP apparatus receives a document including two event mentions via a user interface. In some embodiments, an NLP model generates a dependency tree based on the document and identifies non-dependency path (non-DP) important words (e.g., context words). An SRE machine learning model identifies a dependency path (DP) between two event mentions and performs optimal transport between in-DP words and non-DP words to identify irrelevant words in a dependency tree. The machine learning model prunes the dependency tree by eliminating the irrelevant words to obtain a pruned dependency tree, which is then used for subevent relation prediction. In some examples, a non-DP word is considered important and retained in the pruned dependency tree if the non-DP is aligned with at least one of the in-DP words.

Relation extraction relates to extracting relational information and dependency between a pair of events mentioned in a document. Subevent relation extraction has applications in event understanding, information retrieval, text summarization, etc. Machine learning models use language models to obtain vector representations of documents for subevent prediction. Conventional models rely exclusively on the sequential format of documents (sequence of sentences/words) for representation learning. However, these models fail to identify important context words and filter out irrelevant words due to the sequential nature of input documents.

Therefore, one or more embodiments of the present disclosure include generating a more effective dependency graph that incorporates important context words to improve representation learning efficiency for subevent relation extraction. The NLP apparatus based on the present disclosure goes beyond identifying context words in a dependency path between two event mentions. Additionally, the NLP apparatus includes important context words distributed outside the dependency path, and therefore prediction accuracy is increased.

Embodiments of the present disclosure include obtaining a document comprising a first event mention and a second event mention. An NLP model is used to generate a dependency tree based on the document. An SRE machine learning model prunes, via a pruning component, the dependency tree by removing an irrelevant word to obtain a pruned dependency tree. The SRE machine learning model is trained to generate subevent relation information for the first event mention and the second event mention based on the pruned dependency tree.

In some embodiments, the NLP model generates a dependency tree for each sentence of the document and the roots of several dependency trees are connected to form an overall connected dependency graph. A dependency path is identified between the first event mention and the second event mention. The SRE machine learning model prunes the connected dependency graph to obtain a pruned dependency graph that includes in-DP words and important non-DP context words. This way, embodiments of the present disclosure incorporate context words that are distributed in and outside the dependency path(s) (i.e., in-DP words and non-DP words) to improve the accuracy of subevent relation prediction.

In some examples, a dependency tree includes words within DP (i.e., in-DP words) and words outside DP (i.e., non-DP words). In some embodiments, the NLP apparatus performs or computes an optimal transport between in-DP words and non-DP words to identify irrelevant words in the dependency tree. The irrelevant words are to be removed from the dependency tree. A non-DP word is considered important and relevant if the non-DP word is aligned with one of the in-DP words. The NLP apparatus prunes the dependency tree by eliminating the irrelevant words and retaining only important context words, and uses the pruned dependency tree to determine the relation between the two event mentions.

Some embodiments treat in-DP words as anchors to induce graph structure representations for the document and select important non-DP words by finding an optimal alignment between non-DP and in-DP words. In some cases, a non-DP word is considered important for subevent relation extraction and retained in the induced graph structure if the non-DP word is aligned with one of the in-DP words.

In some embodiments, optimal transport (OT) methods are used to integrate syntactic and semantic information into a single joint optimization task to obtain the optimal alignment for non-DP word selection. Optimal transport aligns two groups of points based on the transportation costs and distributions. Similarly, one or more embodiments leverage semantic similarity to obtain transportation costs while syntactic distances in dependency graphs are used to compute the distributions for in-DP words and non-DP words to perform word alignment for subevent relation extraction. The resulting word alignment is used to select important non-DP words and construct graph structures to learn representations for subevent prediction.

In some embodiments, a pruned dependency graph (e.g., a pruned dependency tree) is input to a graph convolutional network (GCN) which generates a modified representation vector for each word of the pruned dependency tree. A classification network takes the modified representation vector to generate subevent relation information between the two event mentions (e.g., a parent-child relation, a child-parent relation, or a null relation).

Embodiments of the present disclosure may be used in the context of information extraction, knowledge base construction, and question answering applications. For example, an NLP apparatus based on the present disclosure predicts a subevent relation between two event mentions. An example application of the inventive concept in the question answering context is provided with reference to FIG. 2. Details regarding the architecture of an example event argument extraction apparatus are provided with reference to FIGS. 7-8. An example of a process for natural language processing is provided with reference to FIGS. 6 and 9-10. A description of an example training process is described with reference to FIG. 11.

Natural Language Processing

In FIGS. 1-6, a method, apparatus, and non-transitory computer readable medium for natural language processing are described. One or more embodiments of the method, apparatus, and non-transitory computer readable medium include obtaining a document comprising a first event mention and a second event mention; generating a dependency tree based on the document; pruning the dependency tree by removing an irrelevant word to obtain a pruned dependency tree; and generating subevent relation information for the first event mention and the second event mention based on the pruned dependency tree.

Some examples of the method, apparatus, and non-transitory computer readable medium further include generating a word representation vector for each word of the document, wherein the subevent relation information is generated based on the word representation vector.

Some examples of the method, apparatus, and non-transitory computer readable medium further include applying a natural language processing (NLP) model to a word representation vector corresponding to each word of the document.

Some examples of the method, apparatus, and non-transitory computer readable medium further include adding edges between consecutive sentences in the document, wherein the dependency tree is based on the added edges.

Some examples of the method, apparatus, and non-transitory computer readable medium further include identifying a dependency path (DP) between the first event mention and the second event mention based on the dependency tree. Some examples further include computing an alignment function by performing optimal transport between a set of words in the dependency path and a set of words outside the dependency path. Some examples further include identifying the irrelevant word based on the alignment function.

Some examples of the method, apparatus, and non-transitory computer readable medium further include computing a syntactic importance score for the set of words in the dependency path and the set of words outside the dependency path, wherein the alignment function is based on the syntactic importance score.

Some examples of the method, apparatus, and non-transitory computer readable medium further include computing a base irrelevant word based on the set of words outside the dependency path. Some examples further include comparing a plurality of words in the dependency tree to the base irrelevant word to identify the irrelevant word.

In some examples, the first event mention is located in a first sentence of the document and the second event mention is located in a second sentence of the document. Some examples of the method, apparatus, and non-transitory computer readable medium further include generating a modified representation vector for each word of the pruned dependency tree using a GCN, wherein the subevent relation information is generated based on the modified representation vector.

Some examples of the method, apparatus, and non-transitory computer readable medium further include applying a classification network to the modified representation vector to obtain the subevent relation information.

In some examples, the subevent relation information indicates a parent-child relation, a child-parent relation, or a null relation between the first event mention and the second event mention. Some examples of the method, apparatus, and non-transitory computer readable medium further include receiving a query. Some examples further include generating a response to the query based on the subevent relation information.

FIG. 1 shows an example of a natural language processing system according to aspects of the present disclosure. The example shown includes user 100, user device 105, natural language processing (NLP) apparatus 110 (hereinafter "NLP apparatus"), cloud 115, and database 120. NLP apparatus 110 is an example of, or includes aspects of, the corresponding element described with reference to FIGS. 7 and 8.

In an example shown in FIG. 1, user 100 inputs a query "what is the subevent relation between the two event mentions in a document, i.e., 'developed' and 'implemented'?" The query is transmitted to NLP apparatus 110, e.g., via user device 105 and cloud 115. The document of interest is retrieved from database 120. The document includes a first event mention "developed" and a second event mention "implemented". The first event mention is located in a first sentence of the document and the second event mention is located in a second sentence of the document. The first event mention and the second event mention can be in any position of the document, and embodiments of the present disclosure are not limited to just the first two sentences in sequence from the document. In some cases, the first event mention and the second event mention are located far from each other in the document.

NLP apparatus 110 generates subevent relation information for the first event mention and the second event mention based on the pruned dependency tree. The subevent relation information indicates a parent-child relation, a child-parent relation, or a null relation (i.e., no subevent relation) between the first event mention and the second event mention. In the above example, NLP apparatus 110 generates an answer including that "developed" is a subevent of "implemented" and the subevent relation is parent-child relation. The answer is returned to user 100 via cloud 115 and user device 105.

In some embodiment, optimal transport methods are used to jointly consider syntactic and semantic similarities to select important non-DP context words. NLP apparatus 110 computes optimal transport between in-DP words and non-DP words. In some cases, non-DP words that are aligned with one or more of the in-DP words are considered important and/or relevant and these non-DP words are retained in the pruned dependency tree.

User device 105 may be a personal computer, laptop computer, mainframe computer, palmtop computer, personal assistant, mobile device, or any other suitable processing apparatus. In some examples, user device 105 includes software that incorporates a query answering application (e.g., query answering, NLP, subevent relation extraction). In some examples, the query answering application on user device 105 may include functions of NLP apparatus 110.

A user interface may enable user 100 to interact with user device 105. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a user interface may be represented in code which is sent to the user device 105 and rendered locally by a browser. The process of using the NLP apparatus 110 is further described with reference to FIG. 2.

NLP apparatus 110 includes a computer implemented network comprising a text encoder, an NLP model, a pruning component, and an SRE machine learning model. NLP apparatus 110 may also include a processor unit, a memory unit, an I/O module, and a training component. The training component is used to train a machine learning model (or an NLP network). Additionally, NLP apparatus 110 can communicate with database 120 via cloud 115. In some cases, the architecture of the NLP network is also referred to as a network, a machine learning model, or a network model. Further detail regarding the architecture of NLP apparatus 110 is provided with reference to FIGS. 7-8. Further detail regarding the operation of NLP apparatus 110 is provided with reference to FIGS. 2 and 6.

In some cases, NLP apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses the microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user (e.g., user 100). The term cloud is sometimes used to describe data centers available to many users over the Internet. Some large cloud networks have functions distributed over multiple locations from central servers. A server is designated as an edge server if the server has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user (e.g., user 100) interacts with the database controller. In other cases, the database controller may operate automatically without user interaction.

Figure 2:
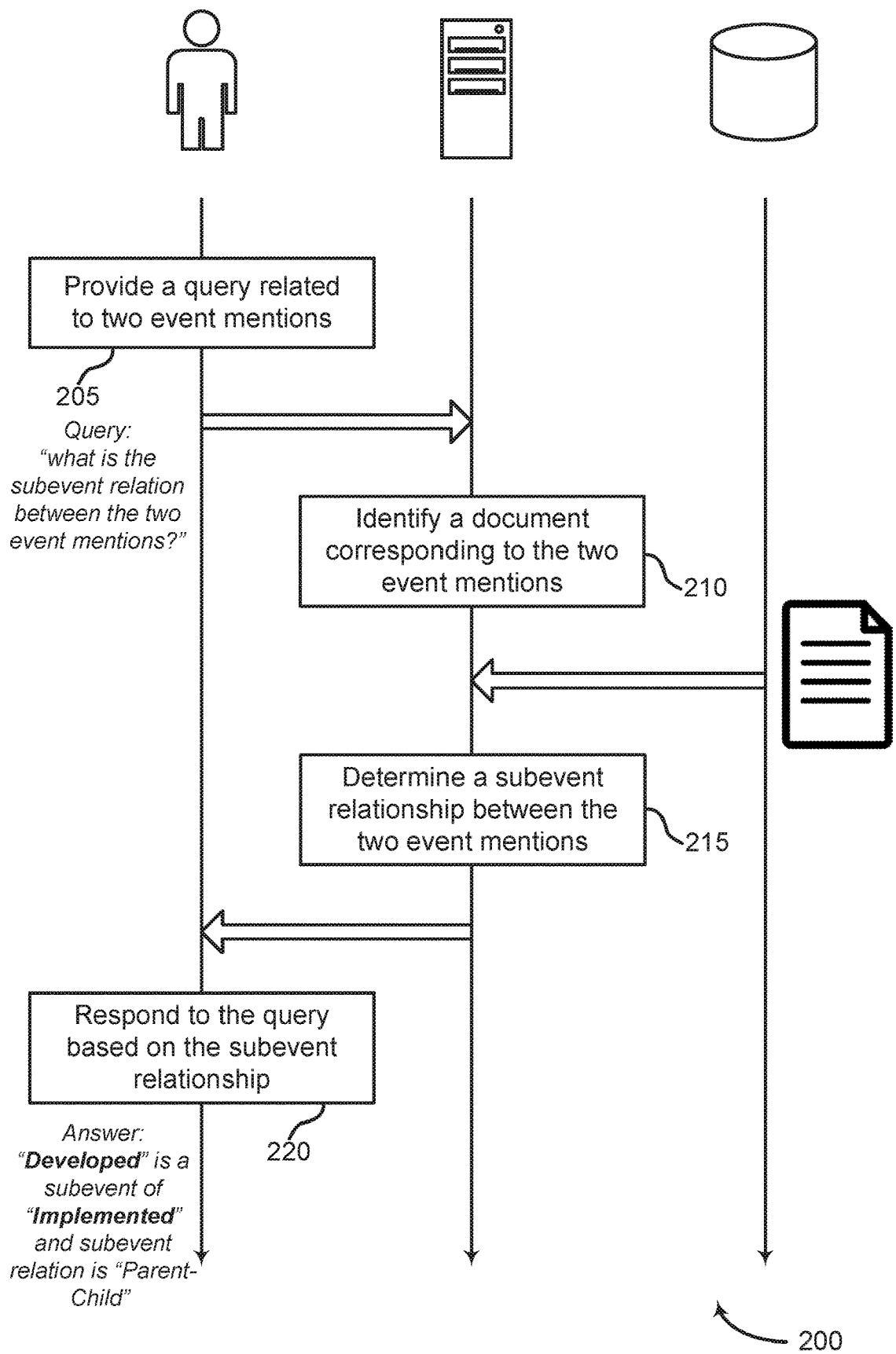
FIG. 2 shows an example of a method of query answering and relation prediction according to aspects of the present disclosure.

FIG. 2 shows an example of a method 200 of query answering and relation prediction according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the user provides a query related to two event mentions, i.e., a first event mention and a second event mention. In some cases, the operations of this step refer to, or may be performed by, a user as described with reference to FIG. 1. For example, the query is a form of a question that states "what is the subevent relation between the two event mentions?", where a first event mentions is "implemented" and a second event mention is "developed".

In information extraction, events are defined as things that happen/occur or changes in the state of real-world entities. Due to the complexity of events and these changes, a general event (i.e., a superevent) can involve multiple other events with finer granularity (i.e., subevents) that can be altogether mentioned in text to present details (e.g., a war can contain multiple attacks, which, in turn, can contain different bombing events).

At operation 210, the system identifies a document corresponding to the two event mentions. In some cases, the operations of this step refer to, or may be performed by, an NLP apparatus as described with reference to FIGS. 1, 7, and 8. In some examples, the document includes the first event mention "implemented" and the second event mention "developed". The first event mention is located in a first sentence of the document. The second event mention is located in a second sentence of the document. The two sentences may be located close to each other or far from each other.

At operation 215, the system determines a subevent relationship between the two event mentions. In some cases, the operations of this step refer to, or may be performed by, an NLP apparatus as described with reference to FIGS. 1, 7, and 8.

In subevent relation extraction (SRE), two event mentions in the document are identified or given. A machine learning model is trained to predict if one event is a part or a subevent of the other event. A subevent relation is established if the subevent is spatially and temporally contained in the general event (i.e., super-event). Accordingly, an SRE machine learning model is configured to model document context to infer spatio-temporal evidence for subevent reasoning. In some cases, subevent relation extraction has applications in summarization and information retrieval.

At operation 220, the system responds to the query based on the subevent relationship. In some cases, the operations of this step refer to, or may be performed by, an NLP apparatus as described with reference to FIGS. 1, 7, and 8. For example, the system displays an answer "'developed' is a subevent of 'implemented' and the subevent relation is 'parent-child'" to a user.

Figure 3:
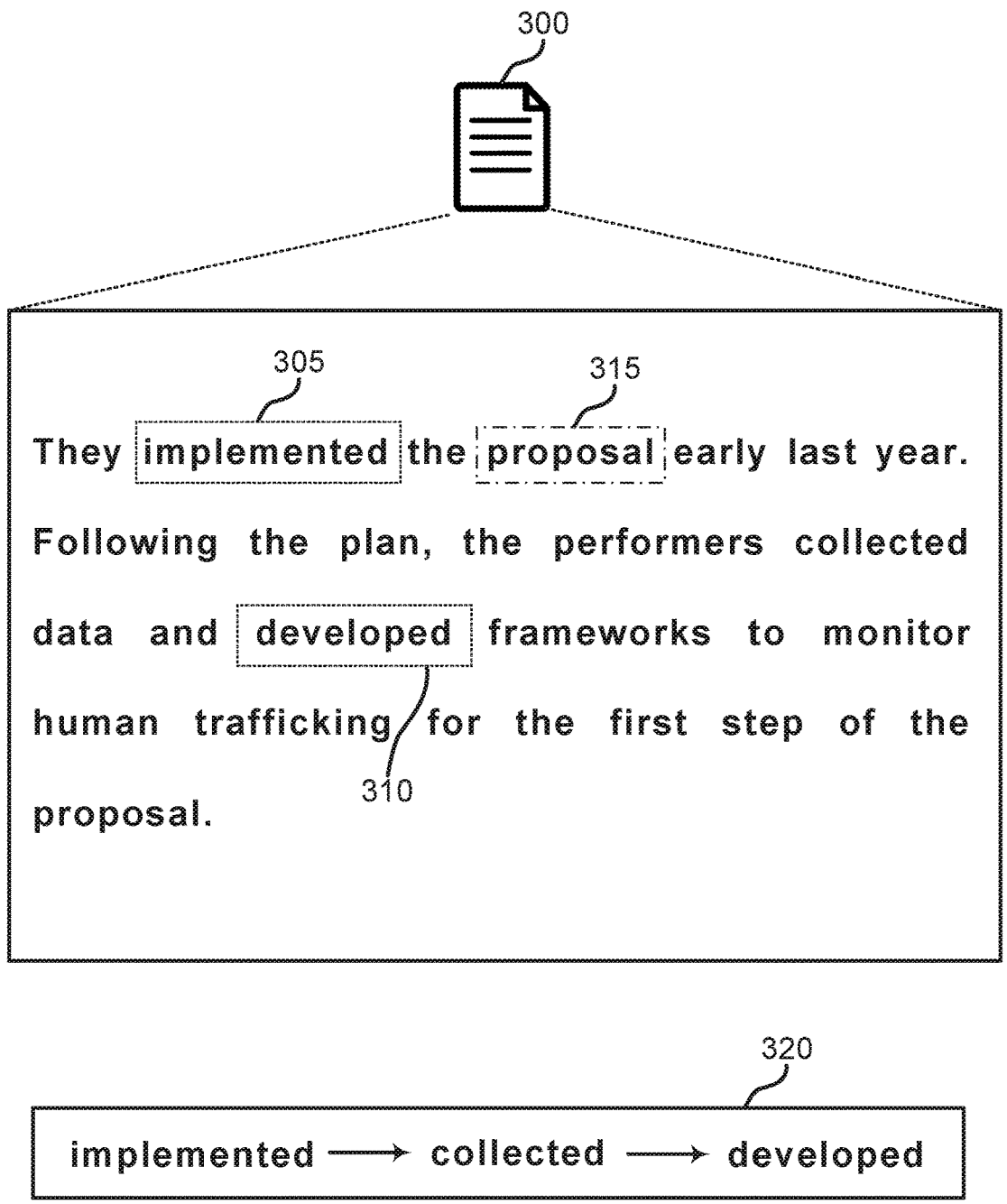
FIG. 3 shows an example of subevent relation extraction based on a document according to aspects of the present disclosure.

FIG. 3 shows an example of subevent relation extraction based on a document according to aspects of the present disclosure. The example shown includes document 300, first event mention 305, second event mention 310, context word 315, and dependency path 320.

Referring to subevent relation extraction tasks, important context words for subevent prediction can be distributed outside the dependency paths, thus necessitating techniques to identify other important words and connect the identified important words with the in-DP words to form better graph structures to represent input texts for subevent relation extraction. For example, document 300 states "They implemented the proposal early last year. Following the plan, the performers collected data and developed frameworks to monitor human trafficking for the first step of the proposal". Here, first event mention 305 is "implemented". Second event mention 310 is "developed". Furthermore, "developed" is a subevent of the "implemented" event for which the dependency path 320 (i.e., DP) is "implemented→collected→developed". The context word 315, "proposal", is important to connect "implemented" and "developed" to the same target for subevent recognition. However, the context word 315 is not included in the dependency path 320. For convenience, "non-DP words" refer to the words that do not belong to the dependency path(s) between two input event mentions for subevent relation extraction.

Document 300 is an example of, or includes aspects of, the corresponding element described with reference to FIGS. 4 and 5. First event mention 305 is an example of, or includes aspects of, the corresponding element described with reference to FIGS. 4 and 5. Second event mention 310 is an example of, or includes aspects of, the corresponding element described with reference to FIGS. 4 and 5. Context word 315 is an example of, or includes aspects of, the corresponding element described with reference to FIG. 5. Dependency path 320 is an example of, or includes aspects of, the corresponding element described with reference to FIG. 5.

Figure 4:
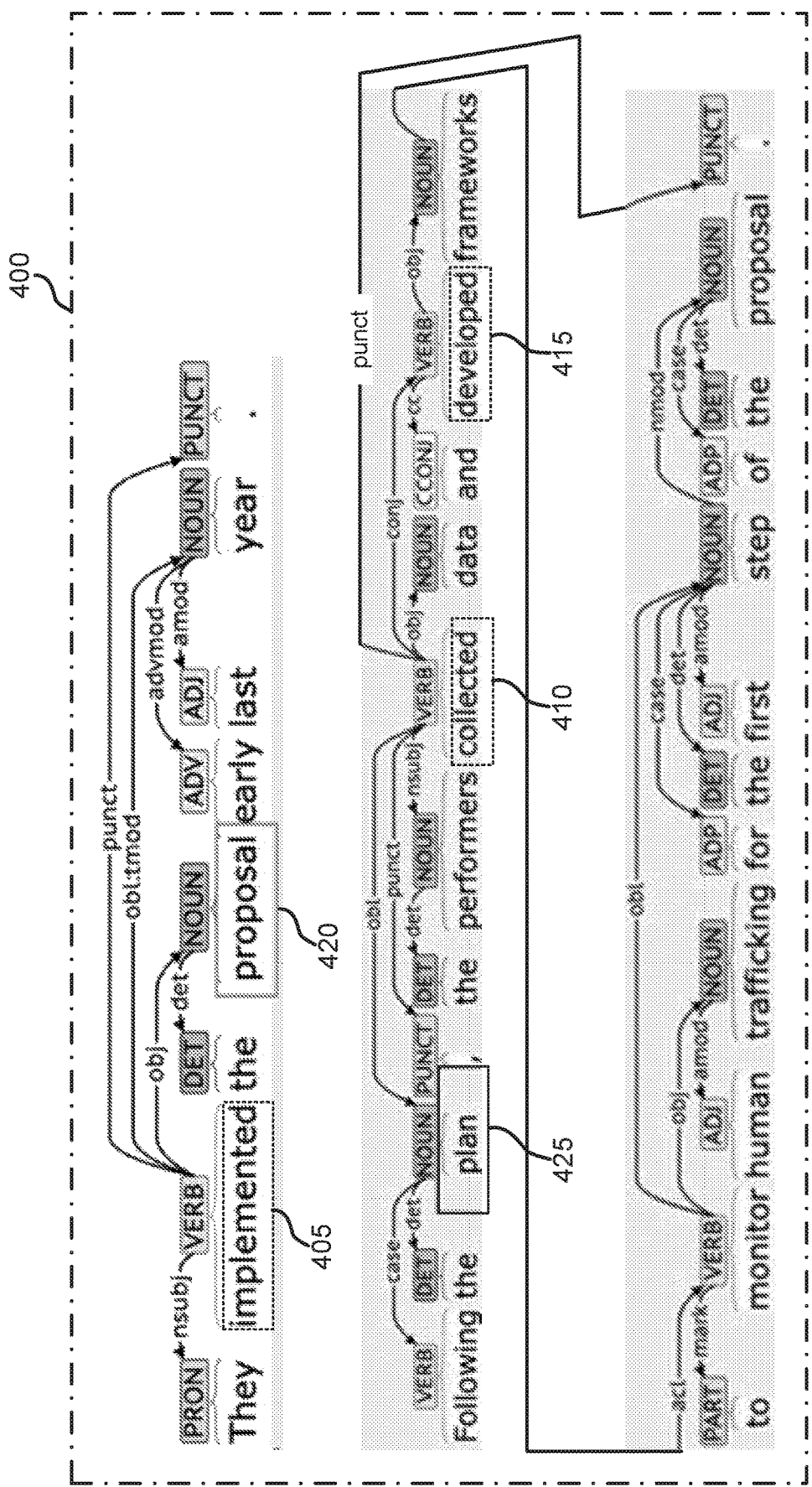
FIG. 4 shows an example of a dependency graph structure according to aspects of the present disclosure.

FIG. 4 shows an example of a dependency graph structure according to aspects of the present disclosure. The example shown includes document 400, first event mention 405, second event mention 410, third event mention 415, first context word 420, and second context word 425.

For example, document 400 includes sentences stating "They implemented the proposal early last year. Following the plan, the performers collected data and developed frameworks to monitor human trafficking for the first step of the proposal". Here, in this example, first event mention 405 is "implemented". Second event mention 410 is "collected". Third event mention 415 is "developed". In some cases, connecting the roots (e.g., implemented→collected) leads to connecting a set of disconnected graphs. In some examples, first context word 420 "proposal" and second context word 425 "plan" are not in same dependency path(s). In some cases, first context word 420 "proposal" belongs to a first dependency path. Second context word 425 "plan" belongs to a second dependency path that is different from the first dependency path. The SRE machine learning model based on the present disclosure generates a more effective graph structure by pruning non-important words. For example, non-important words include words that do not have a relationship with the event mentions (e.g., 405, 410, 415) or context words (e.g., 420, 425). Additionally, the SRE machine learning model retains important words such as first context word 420 "proposal" and second context word 425 "plan". The SRE machine learning model is configured to perform context word selection using alignment methods (i.e., converting a context word selection task to an alignment task).

Document 400 is an example of, or includes aspects of, the corresponding element described with reference to FIGS. 3 and 5. First event mention 405 is an example of, or includes aspects of, the corresponding element described with reference to FIGS. 3 and 5. Second event mention 410 is an example of, or includes aspects of, the corresponding element described with reference to FIGS. 3 and 5.

Figure 5:
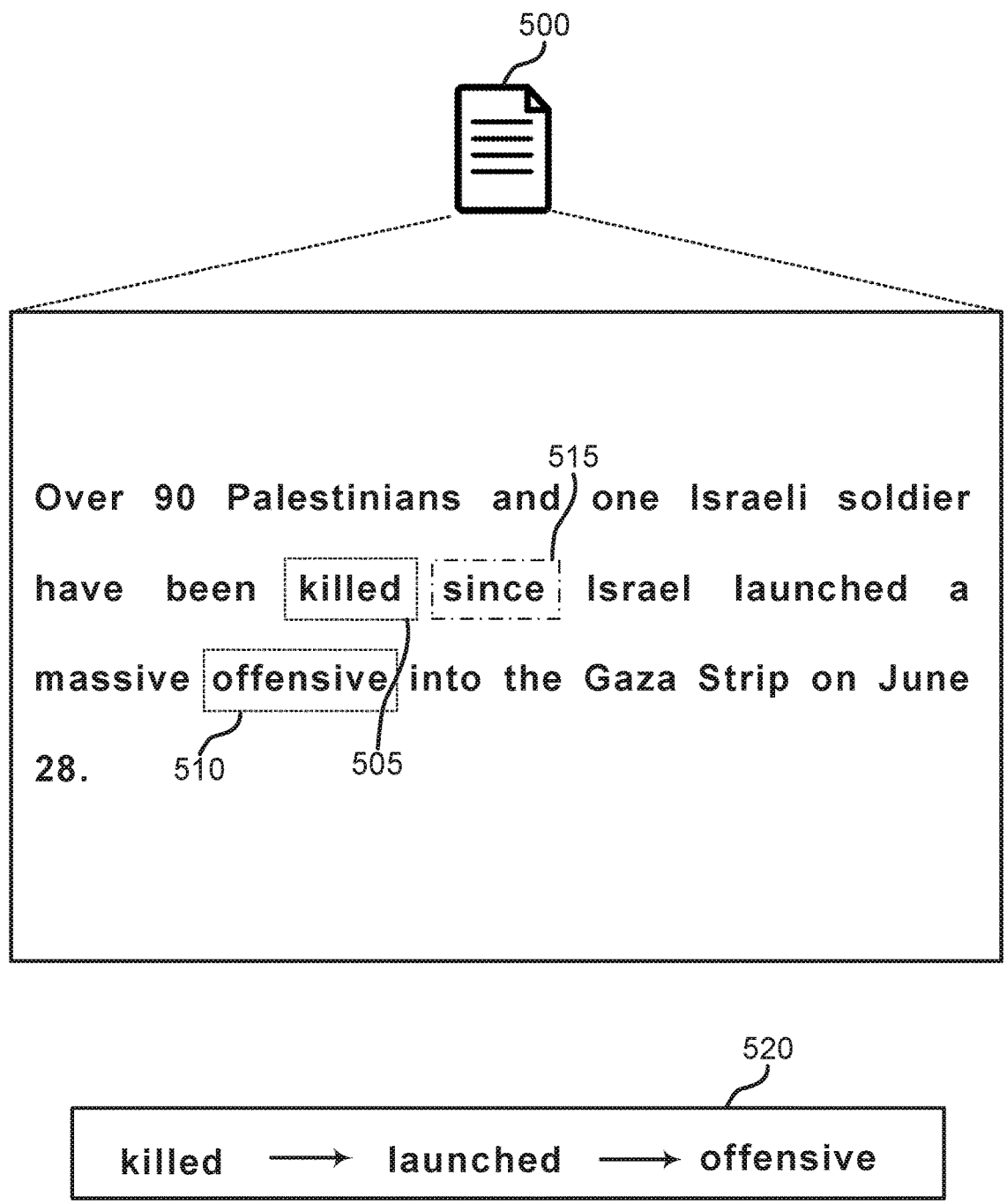
FIG. 5 shows an example of subevent relation extraction based on a document according to aspects of the present disclosure.

FIG. 5 shows an example of subevent relation extraction based on a document according to aspects of the present disclosure. The example shown includes document 500, first event mention 505, second event mention 510, context word 515, and dependency path 520.

Some experiments include analyzing the examples in HiEve that can be successfully predicted by the SRE machine learning model, but the baseline models without optimal transport (OT) fail to predict such representation (i.e., directly using dependency path for representation). In some cases, the SRE machine learning model may be referred to as an OT-SRE model. The OT-SRE model searches for important context words beyond the dependency path to improve subevent prediction performance. HiEve is a corpus for recognizing relations of spatiotemporal containment between events. In HiEve, the narratives are represented as hierarchies of events based on relations of spatiotemporal containment (i.e., superevent-subevent relations).

In an example shown in FIG. 5, document 500 includes the sentence "Over 90 Palestinians and one Israeli soldier have been killed since Israel launched a massive offensive into the Gaza Strip on June 28." First event mention 505 is "killed". Second event mention 510 is "offensive". Dependency path 520 is "killed→launched→offensive" does not provide clear context information to recognize the subevent relation between first event mention 505 and second event mention 510. The SRE machine learning model (or OT-SRE model) is configured to align dependency path 520 with context word 515, i.e., "since", to facilitate subevent relation extraction.

Document 500 is an example of, or includes aspects of, the corresponding element described with reference to FIGS. 3 and 4. First event mention 505 is an example of, or includes aspects of, the corresponding element described with reference to FIGS. 3 and 4. Second event mention 510 is an example of, or includes aspects of, the corresponding element described with reference to FIGS. 3 and 4. Context word 515 is an example of, or includes aspects of, the corresponding element described with reference to FIG. 3. Dependency path 520 is an example of, or includes aspects of, the corresponding element described with reference to FIG. 3.

Figure 6:
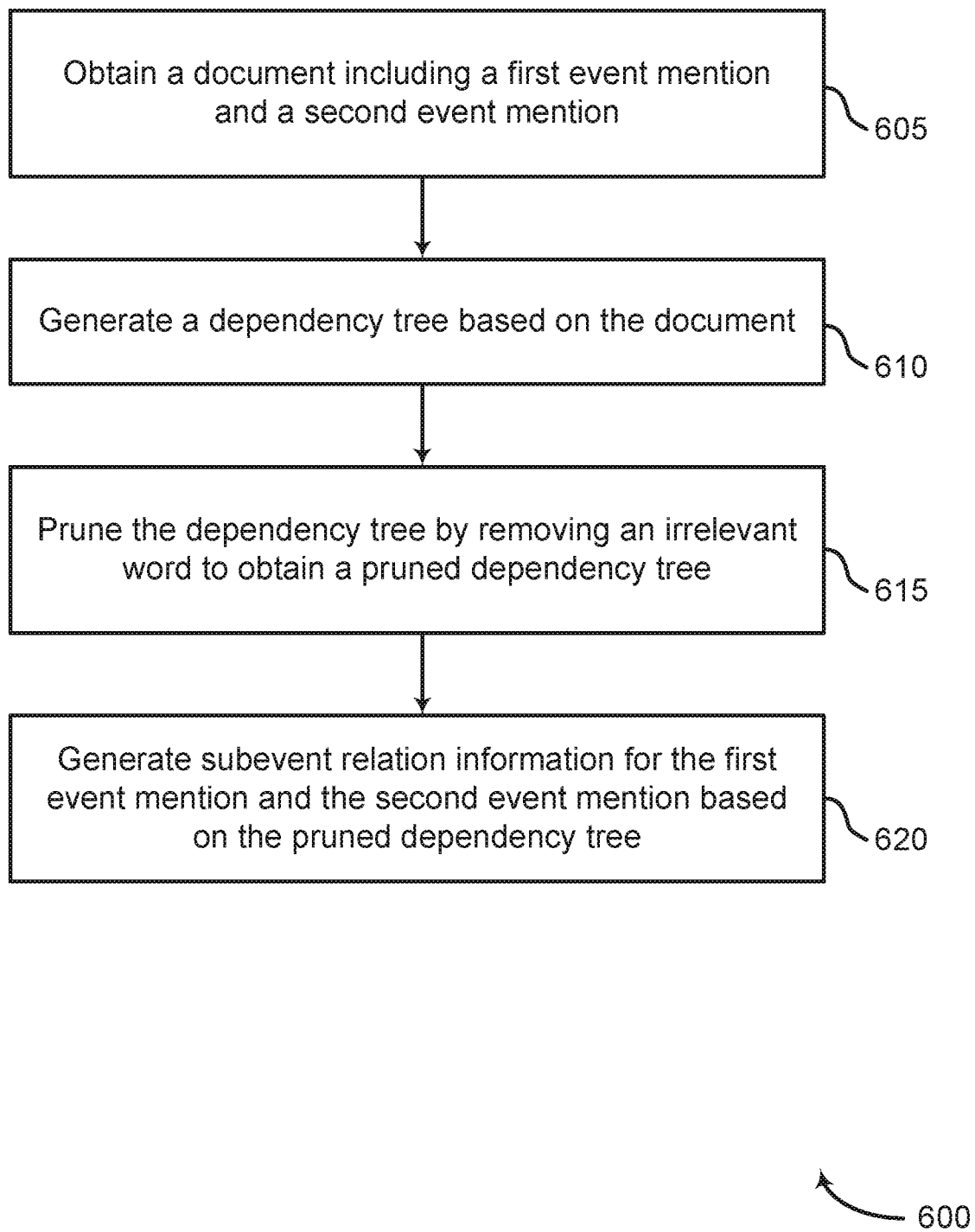
FIG. 6 shows an example of a method for natural language processing according to aspects of the present disclosure.

FIG. 6 shows an example of a method 600 for natural language processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system obtains a document including a first event mention and a second event mention. In some cases, the operations of this step refer to, or may be performed by, the SRE machine learning model as described with reference to FIGS. 7 and 8.

According to some embodiments of the present disclosure, pairwise classification is applied to formulate subevent relation extraction. Given a document $D=[w_1, w_2, \ldots, w_n]$ (of n words) with $w_{e_1}$ and $w_{e_2}$ as input event mentions or event triggers. Here, $w_{e_1}$ is a first event mention and $w_{e_2}$ is a second event mention, the SRE machine learning model is configured to classify subevent relation between first event mention $w_{e_1}$ and second event mention $w_{e_2}$ from a set of subevent types, i.e., parent-child, child-parent, and norel. In some cases, the norel type is to indicate that there is no subevent relation between a first event mention and a second event mention of a document.

In some examples, event mentions are words or phrases that most clearly indicate the occurrence of events. In the sentence "I was hired by XXX Company". The phrase "hire" or "hired" is a trigger word indicating an occurrence of an event.

At operation 610, the system generates a dependency tree based on the document. In some cases, the operations of this step refer to, or may be performed by, an NLP model as described with reference to FIGS. 7 and 8. In some cases, the dependency tree is denoted as T. In an embodiment, an NLP model is configured to generate the dependency tree T for the document D to initialize the graph construction process. A dependency path between first event mention $w_{e_1}$ and second event mention $w_{e_2}$ is identified based on the dependency tree to capture important context for relation prediction. For example, Trankit toolkit is leveraged to generate dependency trees for sentences in the document. The directions in the edges of the trees are ignored in the computation. The roots of the dependency trees of consecutive sentences are connected to generate the dependency tree T.

In some cases, dependency structures represent the grammatical relations that hold between constituents. In some examples, a dependency tree for a sentence is a directed acyclic graph with words as nodes and relations as edges. Each word in the sentence either modifies another word or is modified by a word. The root of the dependency tree is an entry that is modified but does not modify anything else. The relation between any two words in the dependency tree includes a "parent-child", "modifier-modified" relation, "head-modified" relation, or "governor governed" relation. The more specific relation that the two words participate in is given as a name on the edge connecting the nodes. The direction of the arrows are usually from the parent to the child, but the opposite is also valid, given the notation is agreed upon and is consistent for the entire dependency tree.

At operation 615, the system prunes the dependency tree by removing an irrelevant word to obtain a pruned dependency tree. In some cases, the operations of this step refer to, or may be performed by, a pruning component as described with reference to FIGS. 7 and 8. In some cases, the pruned dependency tree is denoted as T'. In some embodiments, the pruning component is configured to prune dependency graph T by removing one or more irrelevant words to generate a pruned dependency tree, where important context words are retained. Words along the dependency paths between two input event mentions (i.e., in-DP words) in T are identified as important context words (i.e., in-DP words are used as the anchor) to further select non-DP words that involve important context to prune the dependency tree T. Detail regarding pruning a dependency tree is further described in FIGS. 9-10.

At operation 620, the system generates subevent relation information for the first event mention and the second event mention based on the pruned dependency tree. In some cases, the operations of this step refer to, or may be performed by, an SRE machine learning model as described with reference to FIGS. 7 and 8.

In some examples, subevent relation information is selected from a set of subevent types between first event mention $w_{e_1}$ and second event mention $w_{e_2}$. Subevent types include parent-child, child-parent, and norel. In some examples, "norel" type is to indicate that there is no subevent relation between a first event mention and a second event mention of a document.

In one or more embodiments, the pruned dependency tree T' is input into a GCN to learn relatively rich representation vectors for the words in T'. The word representation vectors from a pre-trained language model (i.e., in V) serve as the inputs for GCN. The induced hidden vectors in the last layer of GCN are denoted by $V'=v'_{i_1}, \ldots, v'_{i_{|T'|}}$. In some embodiments, an overall modified representation vector A for the document D for SRE is generated via the concatenation: $A=[v'_{e_1}, v'_{e_2}, \max\_pool(v'_{i_1}, \ldots, v'_{i_{|T'|}})]$ where $v'_{e_1}$ and $v'_{e_2}$ are the GCN-induced representation vectors in V' for the input event mentions $w_{e_1}$ and $w_{e_2}$. The overall representation vector A is input into a classification network (e.g., a feed-forward network or "FF" for brevity) followed by a softmax function to compute a distribution $P(\cdot|D, w_{e_1}, w_{e_2})=FF(A)$ over the possible subevent relations. A training component computes a negative log-likelihood function over $P(\cdot|D, w_{e_1}, w_{e_2})$ to train the SRE machine learning model.

Network Architecture

Figure 7:
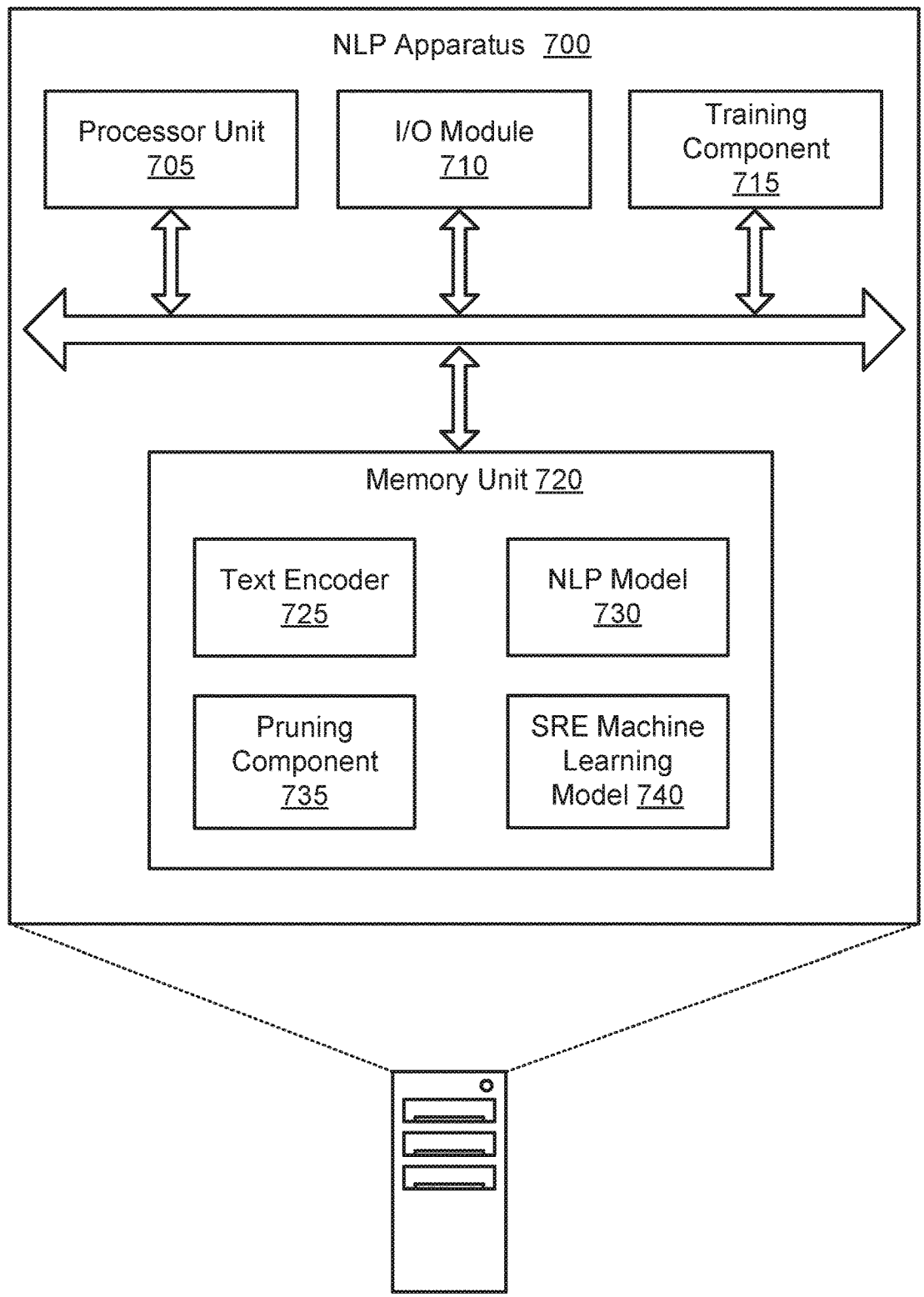
FIG. 7 shows an example of a natural language processing apparatus according to aspects of the present disclosure.
Figure 8:
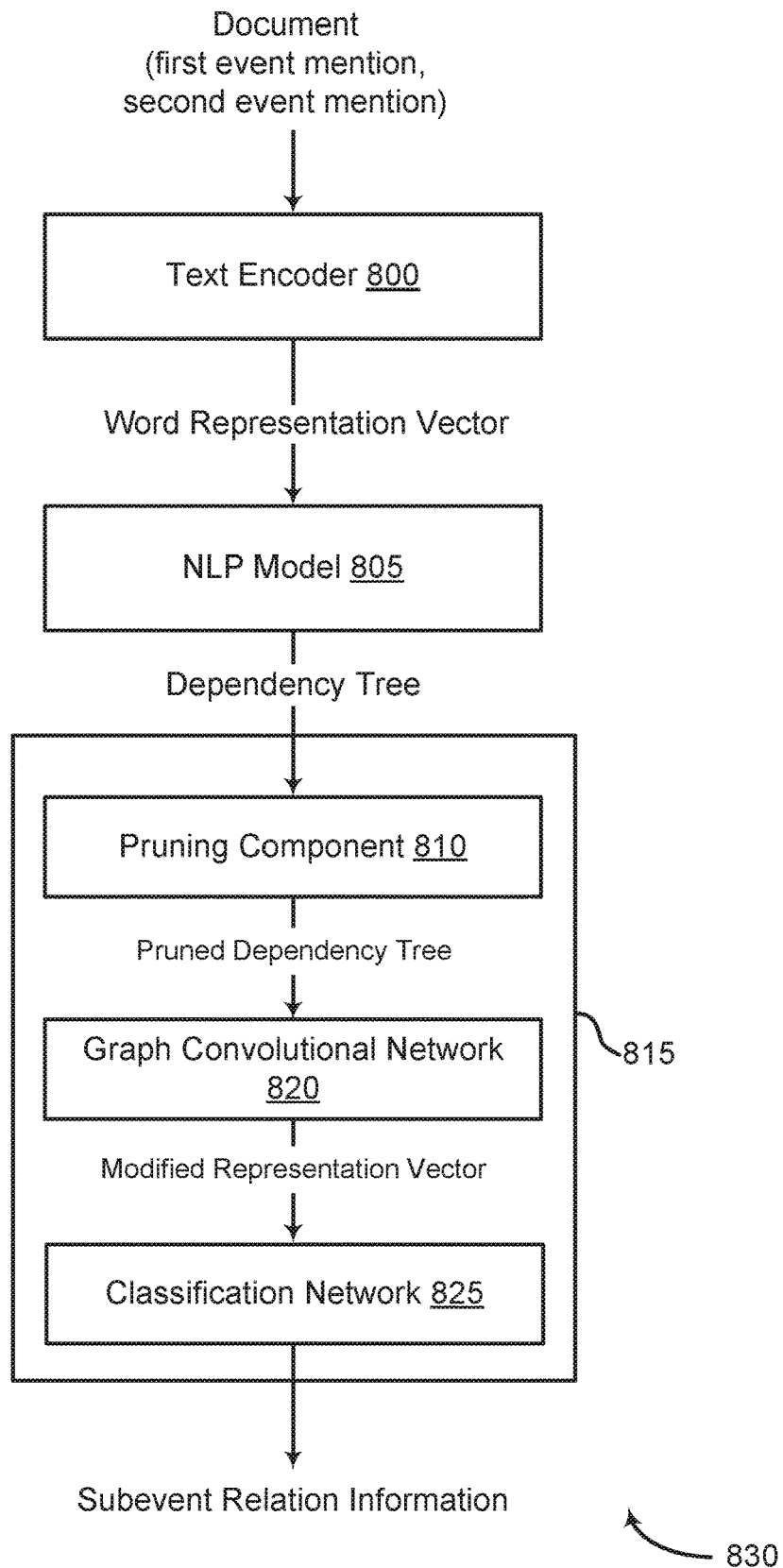
FIG. 8 shows an example of an NLP network architecture according to aspects of the present disclosure.

In FIGS. 7-8, an apparatus and method for natural language processing are described. One or more embodiments of the apparatus and method include at least one processor; at least one memory including instructions executable by the at least one processor; a natural language processing (NLP) model configured to generate a dependency tree based on a document comprising a first event mention and a second event mention; a pruning component configured to prune the dependency tree by removing an irrelevant word to obtain a pruned dependency tree; and an SRE machine learning model comprising parameters stored in the at least one memory and trained to generate subevent relation information for the first event mention and the second event mention based on the pruned dependency tree.

In some examples, the SRE machine learning model comprises a GCN and a classification network. In some examples, the classification network comprises a feed-forward network.

Some examples of the apparatus and method further include a text encoder configured to generate a word representation vector for each word of the document. In some examples, the text encoder comprises a bi-directional encoder representations from transformers (BERT).

FIG. 7 shows an example of an NLP apparatus 700 according to aspects of the present disclosure. The example shown includes NLP apparatus 700, processor unit 705, I/O module 710, training component 715, and memory unit 720. NLP apparatus 700 is an example of, or includes aspects of, the corresponding element described with reference to FIGS. 1 and 8. In one embodiment, memory unit 720 includes text encoder 725, NLP model 730, pruning component 735, and SRE machine learning model 740.

Processor unit 705 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor unit 705 is configured to operate a memory array using a memory controller. In other cases, a memory controller is integrated into the processor. In some cases, processor unit 705 is configured to execute computer-readable instructions stored in a memory to perform various functions. In some embodiments, processor unit 705 includes special-purpose components for modem processing, baseband processing, digital signal processing, or transmission processing. Processor unit 705 is an example of, or includes aspects of, the processor described with reference to FIG. 12.

Examples of memory unit 720 include random access memory (RAM), read-only memory (ROM), or a hard disk. Examples of memory unit 720 include solid-state memory and a hard disk drive. In some examples, memory unit 720 is used to store computer-readable, computer-executable software including instructions that, when executed, cause a processor to perform various functions described herein. In some cases, memory unit 720 contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within memory unit 720 store information in the form of a logical state. Memory unit 720 is an example of, or includes aspects of, the memory subsystem described with reference to FIG. 12.

In some examples, at least one memory unit 720 includes instructions executable by the at least one processor unit 705. Memory unit 720 includes NLP model 730 or stores parameters of NLP model 730.

I/O module 710 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 710 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, NLP apparatus 700 includes a computer implemented artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, the ANN processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, training component 715 obtains training data including ground-truth relation information for a first event mention and a second event mention in a document. In some examples, training component 715 initializes an SRE machine learning model 740. Training component 715 trains the SRE machine learning model 740 based on the predicted subevent relation information and the ground-truth relation information. In some examples, training component 715 computes a negative log-likelihood function based on the predicted subevent relation information and the ground-truth relation information, where the SRE machine learning model 740 is trained based on the negative log-likelihood function. In some examples, training component 715 jointly trains a GCN and a classification network.

According to some embodiments, text encoder 725 generates a word representation vector for each word of the document, where the subevent relation information is generated based on the word representation vector. In some examples, the text encoder 725 includes a bi-directional encoder representations from transformers (BERT). Text encoder 725 is an example of, or includes aspects of, the corresponding element described with reference to FIG. 8.

According to some embodiments, NLP model 730 generates a dependency tree based on the document. In some examples, NLP model 730 is applied to a word representation vector corresponding to each word of the document. In some examples, NLP model 730 adds edges between consecutive sentences in the document, where the dependency tree is based on the added edges. NLP model 730 is an example of, or includes aspects of, the corresponding element described with reference to FIG. 8.

According to some embodiments, pruning component 735 prunes the dependency tree by removing an irrelevant word to obtain a pruned dependency tree. In some examples, pruning component 735 identifies a dependency path (DP) between the first event mention and the second event mention based on the dependency tree. Pruning component 735 computes an alignment function by performing optimal transport between a set of words in the dependency path and a set of words outside the dependency path. Pruning component 735 identifies the irrelevant word based on the alignment function. In some examples, pruning component 735 computes a syntactic importance score for the set of words in the dependency path and the set of words outside the dependency path, where the alignment function is based on the syntactic importance score.

In some examples, pruning component 735 computes a base irrelevant word based on the set of words outside the dependency path. Pruning component 735 compares a set of words in the dependency tree to the base irrelevant word to identify the irrelevant word. Pruning component 735 is an example of, or includes aspects of, the corresponding element described with reference to FIG. 8.

According to some embodiments, SRE machine learning model 740 obtains a document including a first event mention and a second event mention. In some examples, SRE machine learning model 740 generates subevent relation information for the first event mention and the second event mention based on the pruned dependency tree. In some examples, the first event mention is located in a first sentence of the document and the second event mention is located in a second sentence of the document.

In some examples, SRE machine learning model 740 generates a modified representation vector for each word of the pruned dependency tree using a GCN, where the subevent relation information is generated based on the modified representation vector. In some examples, SRE machine learning model 740 applies a classification network to the modified representation vector to obtain the subevent relation information. In some examples, the subevent relation information indicates a parent-child relation, a child-parent relation, or a null relation between the first event mention and the second event mention.

In some examples, SRE machine learning model 740 receives a query. SRE machine learning model 740 generates a response to the query based on the subevent relation information. According to some embodiments, SRE machine learning model 740 generates predicted subevent relation information based on the pruned dependency tree.

According to some embodiments, SRE machine learning model 740 comprises parameters stored in the at least one memory (e.g., memory unit 720) and is trained to generate subevent relation information for the first event mention and the second event mention based on the pruned dependency tree. In some examples, SRE machine learning model 740 includes a GCN and a classification network. In some examples, the classification network includes a feed-forward network. SRE machine learning model 740 is an example of, or includes aspects of, the corresponding element described with reference to FIG. 8.

A GCN is a type of neural network that defines convolutional operation on graphs and uses corresponding structural information. For example, a GCN may be used for node classification (e.g., documents) in a graph (e.g., a citation network), where labels are available for a subset of nodes using a semi-supervised learning approach. A feature description for every node is summarized in a matrix and uses a form of pooling operation to produce a node level output. In some cases, GCNs use dependency trees which enrich representation vectors for subevent relation extraction from input text.

FIG. 8 shows an example of an NLP network architecture according to aspects of the present disclosure. The example shown includes text encoder 800, NLP model 805, pruning component 810, SRE machine learning model 815, and NLP apparatus 830. In one embodiment, SRE machine learning model 815 includes pruning component 810, graph convolutional network 820 and classification network 825. In some examples, pruning component 810 is independent of the SRE machine learning model 815 and not part of it. NLP apparatus 830 is an example of, or includes aspects of, the corresponding element described with reference to FIGS. 1 and 7.

In some embodiments, text encoder 800, e.g., a pre-trained language model such as ROBERTa, takes a document D as input to obtain a word representation vector $v_i$ for each word $w_i \in D$. The document D includes a first event mention and a second event mention. Text encoder 800 is configured to utilize the hidden vectors in the last transformer layer where vectors for the word-pieces in $w_i$ are averaged to compute $v_i$. Let $V=v_1, v_2, \ldots, v_n$ be the sequence of word representation vectors for the words in the document D. In some examples, the document D is split into a set of smaller segments to fit into the length limit of pre-trained language models (having 512 sub-tokens) when the length of the input document exceeds the length limit. The pre-trained language model is configured to run over each segment of the set of smaller segments separately to obtain the representations in V. Text encoder 800 is an example of, or includes aspects of, the corresponding element described with reference to FIG. 7.

NLP model 805 is configured to generate a dependency tree based on the document comprising a first event mention and a second event mention. NLP model 805 is an example of, or includes aspects of, the corresponding element described with reference to FIG. 7.

Subevent relation extraction is a task in information extraction. NLP apparatus 830 is trained to predict spatial and temporal containment relations between event mentions in text (e.g., a document). NLP apparatus 830 focuses on important context words and the interactions between the important context words to enhance representations. In some embodiments, SRE machine learning model 815 is configured to induce effective graph structures for input texts to boost representation learning. SRE machine learning model 815 includes a word alignment component with dependency paths and optimal transport to identify important context words to form an effective graph structure for subevent relation extraction. SRE machine learning model 815 is an example of, or includes aspects of, the corresponding element described with reference to FIG. 7.

In some embodiments, SRE machine learning model 815 is configured to perform subevent relation extraction by leveraging optimal transport to generate a pruned dependency tree for input texts to improve representation learning. Pruning component 810 is configured to prune the dependency tree by removing an irrelevant word to obtain a pruned dependency tree. The pruned dependency tree captures important context words and their connections to facilitate subevent relation extraction. Hence, the pruned dependency tree is a more effective graph structure. Pruning component 810 is an example of, or includes aspects of, the corresponding element described with reference to FIG. 7.

Relation Detection

Figure 9:
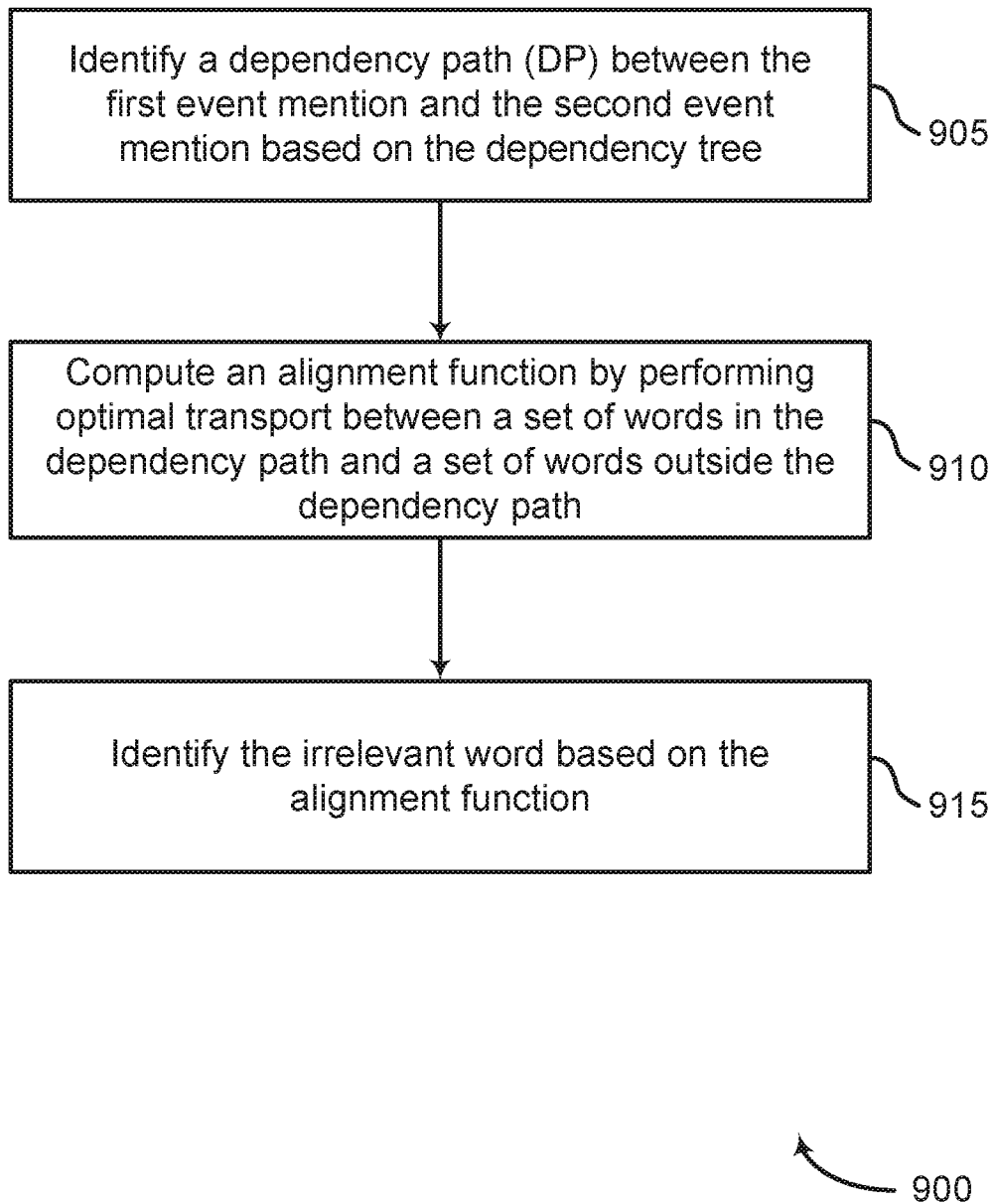
FIGS. 9 and 10 show examples of methods for pruning a dependency tree according to aspects of the present disclosure.

FIG. 9 shows an example of a method 900 for pruning a dependency tree according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system identifies a dependency path (DP) between the first event mention and the second event mention based on the dependency tree. In some cases, the operations of this step refer to, or may be performed by, a pruning component as described with reference to FIGS. 7 and 8.

In some embodiments, the SRE machine learning model is configured to transform the sequential format of document D into a graph representation to capture important context and structures for representation learning for subevent relation extraction. An NLP model is configured to generate a dependency tree T for document D to initialize the graph construction process. A dependency path between $w_{e_1}$ and $w_{e_2}$ is identified based on the dependency tree to capture important context for relation prediction. For example, Trankit toolkit is leveraged to generate dependency trees for the sentences in the document. The directions in the edges of the trees are ignored in the computation. The roots of the dependency trees of consecutive sentences are connected to generate the dependency tree T. In some cases, the words that do not belong to the DPs between two input event mentions in T (i.e., non-DP words) involve both important and irrelevant context words for SRE.

In some embodiments, a pruning component is configured to prune the dependency graph T by removing irrelevant words to generate a pruned dependency tree, where important context words are retained. Words along the dependency paths between two input event mentions (i.e., in-DP words) in T are presumably identified as important context words (i.e., in-DP words are used as the anchor) to further select non-DP words that involve important context to prune the dependency tree T for SRE to obtain a pruned dependency tree.

At operation 910, the system computes an alignment function by performing optimal transport between a set of words in the dependency path and a set of words outside the dependency path. In some cases, the operations of this step refer to, or may be performed by, a pruning component as described with reference to FIGS. 7 and 8.

In some examples, an alignment function is computed between non-DP and in-DP words. Through the computation, a non-DP word is identified as an important context word for subevent relation extraction if the non-DP word is aligned with one in-DP word in the alignment (i.e., extending the anchor in-DP words). In some embodiments, the alignment function between the non-DP words and in-DP words is computed by performing optimal transport to model syntactic and semantic similarities between non-DP and in-DP words. Optimal transport method is used to facilitate the information combination for optimal alignment computation.

At operation 915, the system identifies the irrelevant word based on the alignment function. In some cases, the operations of this step refer to, or may be performed by, a pruning component as described with reference to FIGS. 7 and 8.

In some embodiments, optimal transport method is used to find an optimal plan to transform one distribution to another. Given two distributions p(x) and q(y) over discrete domains $\mathcal{X}$ and $\mathcal{Y}$ (respectively), and the cost function C(x, y):$\mathcal{X} \times \mathcal{Y} \to \mathbb{R}_+$ to map $\mathcal{X}$ into $\mathcal{X}$, optimal transport searches for the optimal joint alignment/distribution π*(x, y) (over $\mathcal{X} \times \mathcal{Y}$) with marginals p(x) and q(y), i.e., the cheapest transportation from p(x) to q(y). The computation is formulated and solved as follows:

$$\pi^*(x, y) = \min_{\pi \in \Pi(x,y)} \sum_y \sum_x \pi(x, y) C(x, y) dx dy \quad (1)$$

$$\text{s.t. } x \sim p(x) \text{ and } y \sim q(y),$$

where Π(x, y) involves all joint distributions with marginals p(x) and q(y).

Here, the distribution π*(x, y) is a matrix whose entry (x, y) captures the probability of transforming the data point x∈ $\mathcal{X}$ to y∈ $\mathcal{Y}$ for the conversion of p(x) to q(y). To obtain a hard alignment between data points $\mathcal{X}$ and $\mathcal{Y}$, the optimal transport method is applied to align each row of π*(x, y) with the column with the highest probability, i.e., y*=argmax $x_{y \in \mathcal{Y}}$ π*(x, y) for all x∈ $\mathcal{X}$.

In some embodiments, the in-DP words in T are treated as the data points for domain $\mathcal{Y}$, while the non-DP words are used for domain $\mathcal{X}$ to apply the optimal transport method to solve non-DP word selection task or identify the irrelevant words. Optimal transport facilitates the integration of syntactic and semantic similarities into the computation of optimal alignment between in-DP and non-DP words by leveraging this information to compute the transformation cost function C (x, y) and the probability distributions p(x) and p(y). In some embodiments, the SRE machine learning model uses syntactic distances of the words to the input event mentions to compute the distributions p(x) and p(y) for x∈ $\mathcal{X}$ and y∈ $\mathcal{Y}$. For example, for each word $w_i \in D$, the lengths of the paths that connect $w_i$ with the input event mentions $w_{e_1}$ and $w_{e_2}$ in the dependency graph T are obtained and denoted as, $d_i^1$ and $d_i^2$, respectively. The syntactic importance of $w_i$ for SRE is determined by syn($w_i$)=max($d_i^1$, $d_1^2$). In some embodiments, the distributions p(x) and p(y) are obtained by normalizing the syntactic importance scores for the words in the corresponding sets of $\mathcal{X}$ and $\mathcal{Y}$ e.g., by using a softmax function. The transportation cost function C(x, y) is computed by leveraging the contextual semantics for the words x and y. The transformation cost function C(x, y) is measured by the Euclidean distance between the representation vectors of the words x and y (i.e., $v_x$ and $v_y$ in V), i.e., C(x, y)=$\|v_x - v_y\|$.

Figure 10:
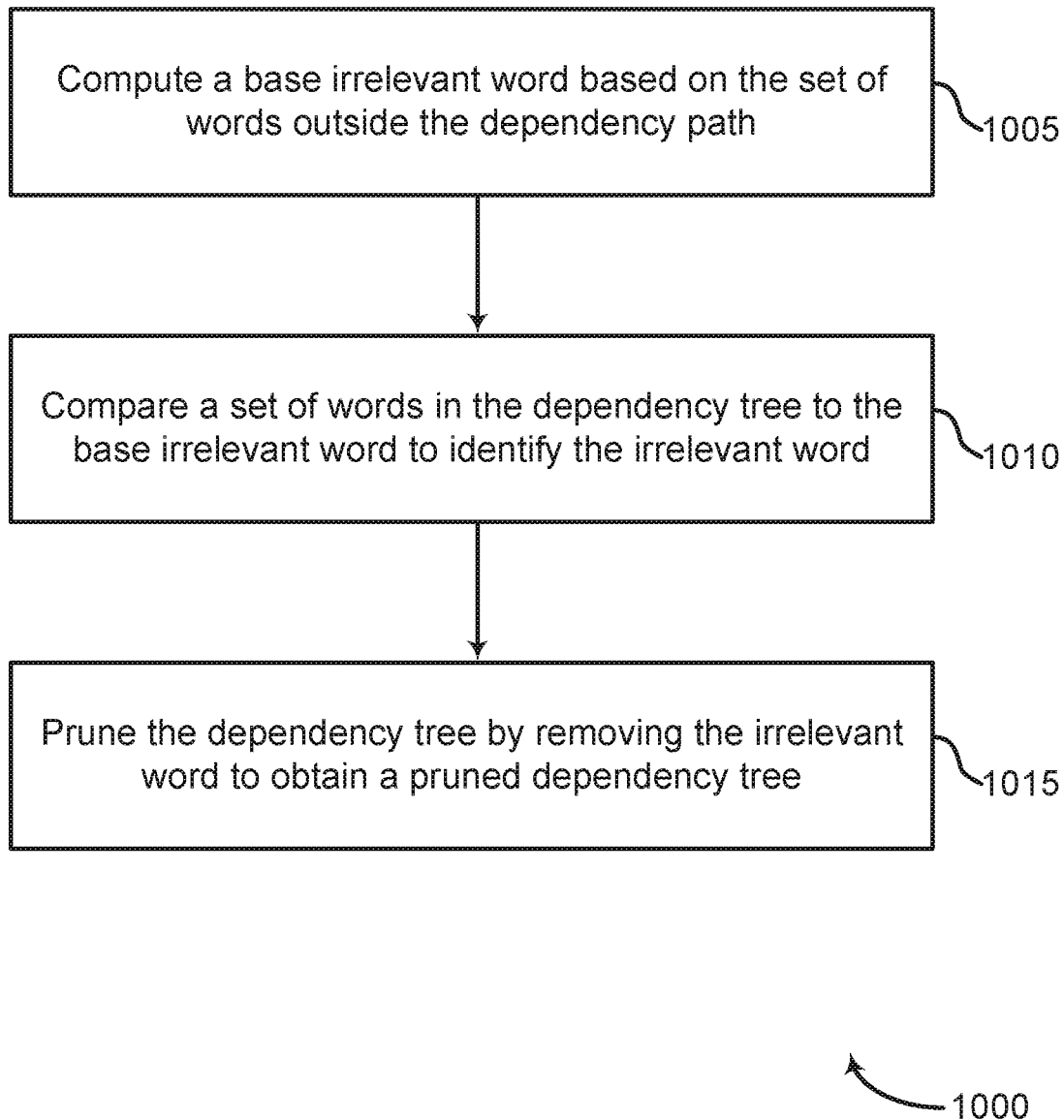

FIG. 10 shows an example of a method 1000 for pruning a dependency tree according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system computes a base irrelevant word based on the set of words outside the dependency path. In some cases, the operations of this step refer to, or may be performed by, a pruning component as described with reference to FIGS. 7 and 8.

In some embodiments, an extra data point, NIL, is introduced to the in-DP set $\mathcal{Y}$ to help select non-DP important context words. The data point NIL is referred to as a base irrelevant word. Non-DP words in $\mathcal{X}$ aligned with NIL are considered irrelevant and excluded from T for graph structure induction for subevent relation extraction. The word representation vector for NIL is computed using an average of the word representation vectors of the in-DP words in $\mathcal{Y}$ and is used for computing transportation cost C(x, y). The syntactic score syn(NIL) for NIL is computed using the average syntactic importance scores for the words in $\mathcal{X}$ and is used for computing the distribution p(x).

At operation 1010, the system compares a set of words in the dependency tree to the base irrelevant word to identify the irrelevant word. In some cases, the operations of this step refer to, or may be performed by, a pruning component as described with reference to FIGS. 7 and 8.

In some embodiments, solving Equation 1 returns the optimal alignment π*(x, y) that provides hard alignment for the data points in $\mathcal{X}$ and $\mathcal{Y}$. In some examples, entropy-based approximation of optimal transport is used and Sinkhorn algorithm is applied to solve it. Let I be the subset of non-DP words in $\mathcal{X}$ that are aligned with NIL in $\mathcal{Y}$ according to π*(x, y) (i.e., irrelevant words). In some cases, a set of words in the dependency tree refer to the subset I.

In some embodiments, the SRE machine learning model is configured to prune the dependency graph T by eliminating the words in/from the dependency tree T to produce a pruned dependency tree (a new graph) that involves exclusively induced important context words for subevent relation extraction. In some cases, the generated graph may be disconnected, so the words in the paths between any word in I and the input event mentions (i.e., $w_{e_1}$ and $w_{e_2}$) are retained in the pruned dependency tree. The pruned dependency tree T' is an induced graph structure to represent the input document for subevent relation extraction.

At operation 1015, the system prunes the dependency tree by removing the irrelevant word to obtain a pruned dependency tree. In some cases, the operations of this step refer to, or may be performed by, a pruning component as described with reference to FIGS. 7 and 8. In some cases, the pruned dependency tree is denoted as T', which is an induced graph structure to represent the input document for subevent relation extraction.

Training and Evaluation

Figure 11:
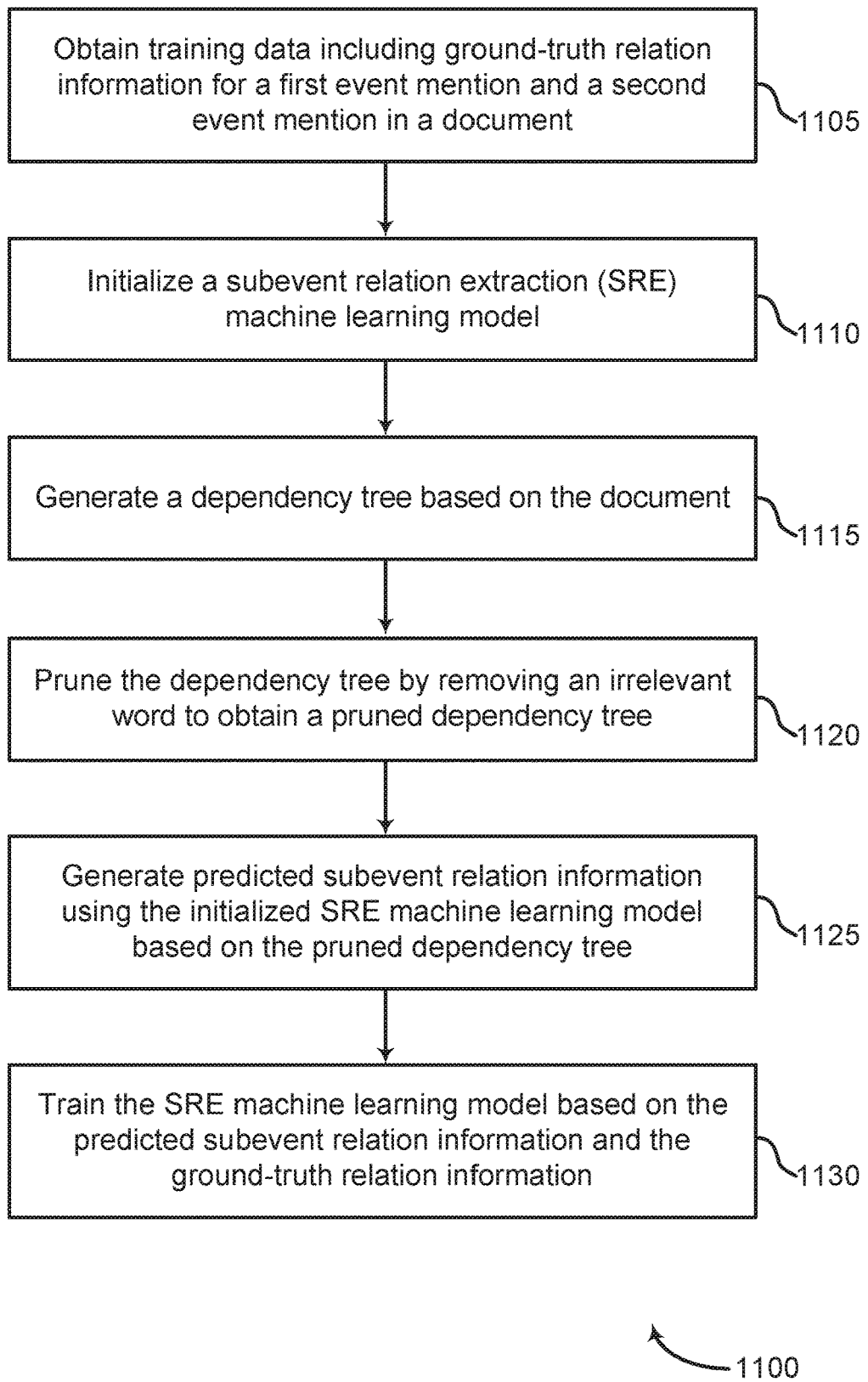
FIG. 11 shows an example of a method for training an SRE machine learning model according to aspects of the present disclosure.

In FIG. 11, a method, apparatus, and non-transitory computer readable medium for natural language processing are described. One or more embodiments of the method, apparatus, and non-transitory computer readable medium include obtaining training data including ground-truth relation information for a first event mention and a second event mention in a document; initializing an SRE machine learning model; generating a dependency tree based on the document; pruning the dependency tree by removing an irrelevant word to obtain a pruned dependency tree; generating predicted subevent relation information using the initialized SRE machine learning model based on the pruned dependency tree; and training the SRE machine learning model based on the predicted subevent relation information and the ground-truth relation information.

Some examples of the method, apparatus, and non-transitory computer readable medium further include computing a negative log-likelihood function based on the predicted subevent relation information and the ground-truth relation information, wherein the SRE machine learning model is trained based on the negative log-likelihood function.

Some examples of the method, apparatus, and non-transitory computer readable medium further include jointly training a GCN and a classification network.

FIG. 11 shows an example of a method 1100 for training an SRE machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during the training process, the parameters and weights of the machine learning model are adjusted to increase the accuracy of the result (i.e., by attempting to minimize a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 1105, the system obtains training data including ground-truth relation information for a first event mention and a second event mention in a document. In some cases, the operations of this step refer to, or may be performed by, a training component as described with reference to FIG. 7.

Some example datasets with subevent relation annotation, e.g., HiEve, IC, and RED, are exclusively annotated for English data and are not able to evaluate the generalization of SRE machine learning models across multiple languages. In some embodiments, a multi-lingual dataset (called mSubEvent) for subevent relation extraction is created to evaluate the SRE machine learning model for multi-lingual SRE. The custom multi-lingual dataset includes human annotation for five typological different languages, i.e., English, Danish, Spanish, Turkish, and Urdu.

The dataset for SRE provides annotations for two tasks, i.e., event mention and subevent relation extraction. In some cases, the annotation guidelines from existing benchmark datasets for event mention and SRE are adopted. In some examples, the annotation guideline and definition for event mentions from the ACE-2005 dataset are employed. During annotation, event mention spans are annotated as the machine learning model relates to subevent relations, while event types are not provided to reduce annotation cost. Event mentions may span multiple consecutive words in a sentence to flexibly handle different languages. In some embodiments, the guidelines from HiEve, which is an existing dataset for subevent relation extraction, are employed for subevent relation annotation. In some embodiments, the custom dataset described in the present disclosure assigns a relation label for each pair of annotated event mentions in a document using three labels, i.e., PARENT-CHILD, CHILD-PARENT, and NOREL.

In some embodiments, documents for annotation are collected from Wikipedia®. Documents in five languages, i.e., English, Danish, Spanish, Turkish, and Urdu, are collected. In some examples, documents are collected from five event-intensive topics/categories in Wikipedia®, including aviation accidents, railway accidents, natural disasters, conflicts, and economic crises. The category hierarchy in Wikipedia®, where a category involves a group of finer topic subcategories, is exploited. Given the initial list of five categories, articles associated with the categories and corresponding descendants (i.e., sub-categories, sub-subcategories) are crawled up to a hierarchy depth of six. Wikipedia® articles in non-English languages for the chosen categories are retrieved by exploiting the interlinks across languages. The crawled articles are cleaned by removing markup elements (e.g., lists, tables, images). The cleaned articles are split into sentences and tokenized into words by Trankit, which is a multi-lingual NLP toolkit.

Annotating Wikipedia® articles is challenging because the articles are long and the number of possible mention pairs grows quadratically with respect to the number of event mentions in a document. In some cases, to facilitate annotators, the cleaned articles are split into a set of shorter chunks that contain five consecutive sentences (called "documents"). In this way, the annotators process a relatively short document at a time to improve the attention and quality of annotated data.

In some embodiments, the annotation task includes two steps comprising event mention and subevent relation annotation. For a language, subevent relations are annotated over the outputs from event mention annotation (i.e., after event mention annotation has been completed and finalized for all documents). Given a sample of selected documents for a language, for each step, the two annotators for that language independently annotate event mentions/subevent relations for the documents. An annotator completely annotates one document at a time. Afterward, the annotation conflicts are presented to the annotators for further discussion and revision to produce the final version of annotated documents for the current task. This helps to achieve high agreement and consistency for the custom dataset.

At operation 1110, the system initializes an SRE machine learning model. In some cases, the operations of this step refer to, or may be performed by, a training component as described with reference to FIG. 7. In some examples, parameters of the SRE machine learning model are initialized. Hyperparameters (e.g., learning rate) are set.

At operation 1115, the system generates a dependency tree based on the document. In some cases, the operations of this step refer to, or may be performed by, an NLP model as described with reference to FIGS. 7 and 8.

At operation 1120, the system prunes the dependency tree by removing an irrelevant word to obtain a pruned dependency tree. In some cases, the operations of this step refer to, or may be performed by, a pruning component as described with reference to FIGS. 7 and 8.

In some examples, in-DP words can be extended to find additional important context words for relation prediction by including non-DP words close to the dependency paths in the dependency graphs (e.g., based on syntactic distances). Additionally or alternatively, the SRE machine learning model takes into account contextual semantics of the words that can provide relatively rich information for important word selection for SRE. Syntactic and semantic evidences are leveraged to determine the importance of a non-DP word for inclusion into the graph structure to represent input text for SRE. For syntactic information, a word is considered more important for subevent prediction if it is closer to the input event mentions in the dependency graphs. In addition, for semantic information, the model promotes non-DP words that are more similar/related to in-DP words contextually to enhance the induced representations for SRE.

At operation 1125, the system generates predicted subevent relation information using the initialized SRE machine learning model based on the pruned dependency tree. In some cases, the operations of this step refer to, or may be performed by, an SRE machine learning model as described with reference to FIGS. 7 and 8.

At operation 1130, the system trains the SRE machine learning model based on the predicted subevent relation information and the ground-truth relation information. In some cases, the operations of this step refer to, or may be performed by, a training component as described with reference to FIG. 7.

In an embodiment, the overall representation vector A is input into a classification network (e.g., a feed-forward network or "FF" for brevity) followed by a softmax to compute a distribution $P(\cdot|D, w_{e_1}, w_{e_2}) = FF(A)$ over the possible subevent relations. A training component computes a negative log-likelihood function over $P(\cdot|D, w_{e_1}, w_{e_2})$ to train the SRE machine learning model.

In some examples, a multi-lingual SRE dataset for five typologically different languages is created to enable subevent relation extraction on non-English languages. At inference, the SRE machine learning model can process input texts of different non-English languages.

Figure 12:
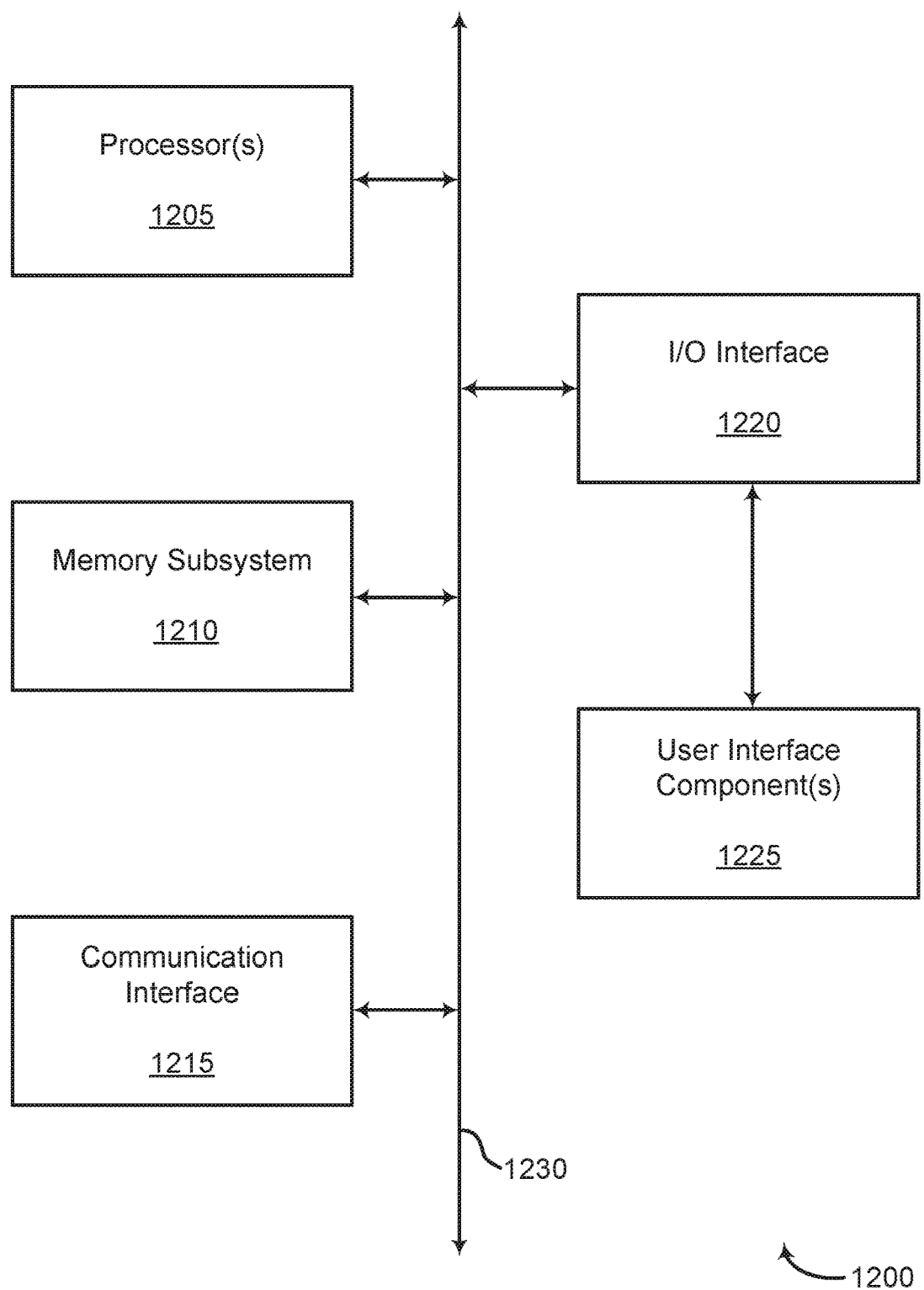
FIG. 12 shows an example of a computing device for NLP according to aspects of the present disclosure.

FIG. 12 shows an example of a computing device 1200 for NLP according to aspects of the present disclosure. The example shown includes computing device 1200, processor(s) 1205, memory subsystem 1210, communication interface 1215, I/O interface 1220, user interface component(s) 1225, and channel 1230.

In some embodiments, computing device 1200 is an example of, or includes aspects of, NLP apparatus 110 of FIG. 1. In some embodiments, computing device 1200 includes one or more processors 1205 that can execute instructions stored in memory subsystem 1210 to obtain a document comprising a first event mention and a second event mention; generate a dependency tree based on the document; prune the dependency tree by removing an irrelevant word to obtain a pruned dependency tree; and generate subevent relation information for the first event mention and the second event mention based on the pruned dependency tree.

According to some embodiments, computing device 1200 includes one or more processors 1205. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing. Processor(s) 1205 is an example of, or includes aspects of, the processor unit described with reference to FIG. 7.

According to some embodiments, memory subsystem 1210 includes one or more memory devices. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state. Memory subsystem 1210 is an example of, or includes aspects of, the memory unit described with reference to FIG. 7.

According to some embodiments, communication interface 1215 operates at a boundary between communicating entities (such as computing device 1200, one or more user devices, a cloud, and one or more databases) and channel 1230 and can record and process communications. In some cases, communication interface 1215 is provided to enable a processing system coupled to a transceiver (e.g., a transmitter and/or a receiver). In some examples, the transceiver is configured to transmit (or send) and receive signals for a communications device via an antenna.

According to some embodiments, I/O interface 1220 is controlled by an I/O controller to manage input and output signals for computing device 1200. In some cases, I/O interface 1220 manages peripherals not integrated into computing device 1200. In some cases, I/O interface 1220 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1220 or via hardware components controlled by the I/O controller.

According to some embodiments, user interface component(s) 1225 enable a user to interact with computing device 1200. In some cases, user interface component(s) 1225 include an audio device, such as an external speaker system, an external display device such as a display screen, an input device (e.g., a remote control device interfaced with a user interface directly or through the I/O controller), or a combination thereof. In some cases, user interface component(s) 1225 include a GUI.

Performance of apparatus, systems and methods of the present disclosure have been evaluated, and results indicate embodiments of the present disclosure have obtained increased performance over existing technology. Example experiments demonstrate that the NLP apparatus based on the present disclosure outperforms conventional systems.

Some example experiments evaluate apparatus and methods of the present disclosure over HiEve and Intelligence Community (IC), which are public datasets for SRE. These existing datasets are developed and evaluated over English data. Some embodiments of the present disclosure generalize SRE methods to non-English languages by creating a custom multi-lingual dataset for SRE (called mSubEvent). The mSubEvent dataset covers five languages, i.e., English, Danish, Spanish, Turkish, and Urdu, to enable multi-lingual learning for SRE. The mSubEvent dataset follows the annotation guidelines in HiEve and includes more than 46K event mentions and 3.9K subevent relations. Example experiments are conducted over HiEve and the dataset mSubEvent. These experiments cover monolingual learning (i.e., training and test data are from the same language) and cross-lingual transfer learning evaluation (i.e., training and test data comes from different language), thus highlighting the generalization across languages of the described methods for SRE in the present disclosure (e.g., explored multi-lingual data and cross-lingual learning for SRE).

About datasets and hyper-parameters, methods and apparatus of the present disclosure are evaluated on datasets for SRE, e.g., HiEve and Intelligence Community. For example, HiEve provides subevent and coreference relation annotation for events over 100 news articles using four relation labels, i.e., PARENT-CHILD, CHILD-PARENT (for subevents), COREF (for coreference), and NOREL (for no relation). To make it comparable, the same data split and setting is used, featuring 80 documents for training (2,423 subevent relations and 0.4 probability for down-sampling of negative examples) and 20 documents for testing (817 subevent relations). For Intelligence Community, it also annotates 100 news articles for four subevent and coreference relations as in HiEve. Following the same setting in the method for Intelligence Community, relations with implicit event mentions are discarded and the evaluation process involves computing transitive closure for both subevent relations and coreference to obtain annotation for all event mention pairs as in HiEve. Also, Intelligence Community is divided into three portions with 60/20/20 documents for training/development/test data respectively.

In some examples, the SRE machine learning model are evaluated on the new multilingual dataset mSubEvent to obtain baselines. Here, the evaluation process involves randomly splitting the documents for each language in mSubEvent into three separate parts with a ratio of 3/1/1 for training, development, and test data (respectively). mSubEvent is used to evaluate the SRE machine learning model in both monolingual and cross-lingual transfer learning experiments.

In some embodiments, the hyper-parameters for the OT-SRE machine learning model are fine-tuned over English development data of mSubEvent. For example, selected hyper-parameters for the model include 2 layers for the GCN and feed-forward (i.e., FF) models with 512 dimensions for the hidden vectors, 5e-5 for the learning rate with Adam optimizer, and 16 for the batch size. The ROBERTa$_{base}$ model encodes input texts for HiEve. For mSubEvent, the multi-lingual pre-trained language models (base versions), e.g., mBERT and XLMR, are used for multi-lingual text encoding.

The SRE machine learning model is trained for four relation labels in HiEve (including COREF). The performance for comparison is measured according to the F1 scores of the subevent relations, i.e., PARENT-CHILD, CHILD-PARENT, and their micro-average. The OT-SRE model based on the present disclosure significantly outperforms the baseline models ($p<0.01$) with substantial gaps for both HiEve and IC. In some examples, for HiEve, OT-SRE improves by 3% over the average F1 score for subevent relations. OT-SRE increases performance for HiEve (i.e., SCS) and IC (i.e., EventSeg) by 3% and 2.7%, respectively, over the average F1 score for subevent relations. The results demonstrate the effectiveness of OT-based methods and apparatus for graph structure induction to optimize representation learning for SRE.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application-specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
    obtaining a document comprising a first event mention and a second event mention;
    generating a dependency tree based on the document;
    identifying a dependency path (DP) between the first event mention and the second event mention based on the dependency tree;
    computing an alignment function by performing optimal transport between a set of words in the dependency path and a set of words outside the dependency path;
    identifying an irrelevant word based on the alignment function;
    pruning the dependency tree by removing the irrelevant word to obtain a pruned dependency tree; and
    generating subevent relation information for the first event mention and the second event mention based on the pruned dependency tree.

2. The method of claim 1, further comprising:
    generating a word representation vector for each word of the document, wherein the subevent relation information is generated based on the word representation vector.

3. The method of claim 1, wherein generating the dependency tree comprises:
    applying a natural language processing (NLP) model to a word representation vector corresponding to each word of the document.

4. The method of claim 1, further comprising:
    adding edges between consecutive sentences in the document, wherein the dependency tree is based on the added edges.

5. The method of claim 1, further comprising:
    computing a syntactic importance score for the set of words in the dependency path and the set of words outside the dependency path, wherein the alignment function is based on the syntactic importance score.

6. The method of claim 1, further comprising:
    computing a base irrelevant word based on the set of words outside the dependency path; and
    comparing a plurality of words in the dependency tree to the base irrelevant word to identify the irrelevant word.

7. The method of claim 1, wherein:
    the first event mention is located in a first sentence of the document and the second event mention is located in a second sentence of the document.

8. The method of claim 1, further comprising:
    generating a modified representation vector for each word of the pruned dependency tree using a graph convolutional network (GCN), wherein the subevent relation information is generated based on the modified representation vector.

9. The method of claim 8, further comprising:
    applying a classification network to the modified representation vector to obtain the subevent relation information.

10. The method of claim 1, wherein:
    the subevent relation information indicates a parent-child relation, a child-parent relation, or a null relation between the first event mention and the second event mention.

11. The method of claim 1, further comprising:
    receiving a query; and
    generating a response to the query based on the subevent relation information.

12. A method comprising:
    obtaining training data including ground-truth relation information for a first event mention and a second event mention in a document;
    initializing a subevent relation extraction (SRE) machine learning model;
    generating a dependency tree based on the document;
    identifying a dependency path (DP) between the first event mention and the second event mention based on the dependency tree;
    computing an alignment function by performing optimal transport between a set of words in the dependency path and a set of words outside the dependency path;
    identifying an irrelevant word based on the alignment function;
    pruning the dependency tree by removing the irrelevant word to obtain a pruned dependency tree;
    generating predicted subevent relation information using the initialized SRE machine learning model based on the pruned dependency tree; and
    training the SRE machine learning model based on the predicted subevent relation information and the ground-truth relation information.

13. The method of claim 12, further comprising:
    computing a negative log-likelihood function based on the predicted subevent relation information and the ground-truth relation information, wherein the SRE machine learning model is trained based on the negative log-likelihood function.

14. The method of claim 12, wherein training the SRE machine learning model comprises:
    jointly training a graph convolutional network (GCN) and a classification network.

15. An apparatus comprising:
    at least one processor;
    at least one memory including instructions executable by the at least one processor;
    a natural language processing (NLP) model configured to generate a dependency tree based on a document comprising a first event mention and a second event mention;
    a pruning component configured to prune the dependency tree by identifying a dependency path (DP) between the first event mention and the second event mention based on the dependency tree, computing an alignment function by performing optimal transport between a set of words in the dependency path and a set of words outside the dependency path, identifying an irrelevant word based on the alignment function, and removing the irrelevant word to obtain a pruned dependency tree; and a subevent relation extraction (SRE) machine learning model comprising parameters stored in the at least one memory and trained to generate subevent relation information for the first event mention and the second event mention based on the pruned dependency tree.

16. The apparatus of claim 15, wherein:
the SRE machine learning model comprises a graph convolutional network (GCN) and a classification network.

17. The apparatus of claim 16, wherein:
the classification network comprises a feed-forward network.

18. The apparatus of claim 15, further comprising:
a text encoder configured to generate a word representation vector for each word of the document.

19. The apparatus of claim 18, wherein:
the text encoder comprises a bi-directional encoder representations from transformers (BERT).

* * * * *